I. B. SANDUSKY.
Seed-Cleaning Machine.

No. 200,410. Patented Feb. 19, 1878.

Attest.
D. A. King
John McMurtry.

Inventor.
I. B. Sandusky

UNITED STATES PATENT OFFICE.

ISAAC B. SANDUSKY, OF FAYETTE COUNTY, KENTUCKY.

IMPROVEMENT IN SEED-CLEANING MACHINES.

Specification forming part of Letters Patent No. 200,410, dated February 19, 1878; application filed August 27, 1877.

*To all whom it may concern:*

Be it known that I, ISAAC B. SANDUSKY, of the county of Fayette and State of Kentucky, have invented an Improved Machine for Cleaning Seeds of Chaff and other foreign matters; and I do declare that the following is a full, clear, and exact description thereof, reference being had to the accompanying drawing, in which—

Figure 1:
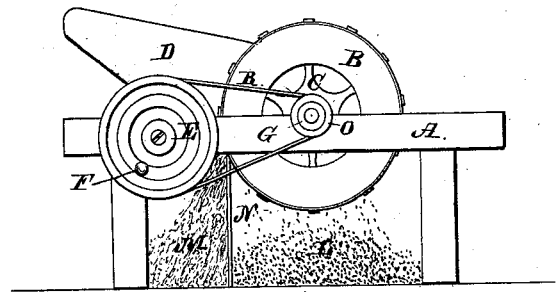
Figure 2:
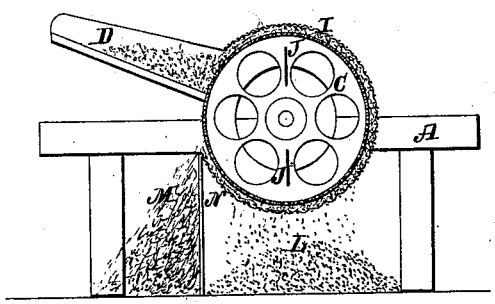
Figure 3:
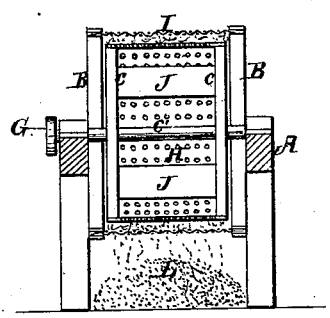
Figure 4:
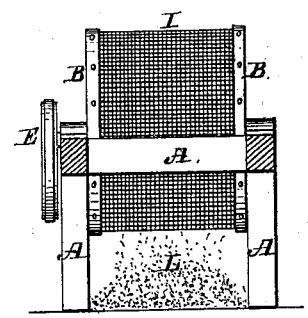

Figure is a side elevation; Fig. 2, a longitudinal section; Fig. 3, a transverse section, and Fig. 4 a rear end view.

Mounted in suitable journal-bearings on a stout frame is the rotary cylinder C, which is constructed with two open supporting-heads, $c$ $c$, mounted upon a shaft, $c'$, and connected with each other by longitudinal fan-blades J J and the scouring-jacket H, which is made of sheet metal, with punched perforations made from within outward, so as to serve the double purpose of a scouring and a blowing cylinder by means of the blast generated by the fan-blades J, which draw the air through the perforated heads $c$ $c$.

The concave or stationary scouring-jacket I is formed preferably of wire-gauze coarse enough to permit the escape both of the seed and the husks and other impurities, said wire-gauze being supported on open heads B B, which retain the material under operation while permitting the entrance of air to the inner cylinder.

In order to permit the access to the inside, I prefer making this outer scouring-cylinder in two sections, hinged together, the lower one rigidly secured to the frame A. The upper may have the hopper D formed with or otherwise rigidly secured to it.

The concave I is not a complete cylinder, and the open space so left forms a feed-opening, K, above the line of the hopper, as shown, where the seed to be cleaned enters, and a discharge-opening, P, below the line of the hopper, where coarser matters M are ejected. The seed thus passing around nearly the entire circumference of the scourer, if not sufficiently cleansed before this to pass through the gauze and drop beneath it at L, a divider, N, may be used to prevent the mingling of the seed with the refuse.

A crank, E, band R, and small pulley O may be employed to give rapid motion to the scouring-cylinder.

I claim as my invention—

The combination of the rotating perforated scouring-cylinder, formed of outwardly-punched sheet metal, and provided with fan-blades in its interior, and the perforate scouring-jacket, substantially as described, and for the purpose set forth.

I. B. SANDUSKY.

Attest:
 JOHN MCMURTRY,
 I. A. G. WILLIAMSON.